United States Patent
Wei et al.

(10) Patent No.: US 12,112,409 B2
(45) Date of Patent: Oct. 8, 2024

(54) METHOD AND SYSTEM FOR PIXELATING VECTOR GRAPHIC INTO IMAGE

(71) Applicant: Wuhan Yuwei Optical Software Co., Ltd., Hubei (CN)

(72) Inventors: Haiqing Wei, Hubei (CN); Zhikang Zhou, Hubei (CN)

(73) Assignee: WUHAN YUWEI OPTICAL SOFTWARE CO., LTD., Hubei (CN)

( * ) Notice: Subject to any disclaimer, the term of this patent is extended or adjusted under 35 U.S.C. 154(b) by 206 days.

(21) Appl. No.: 17/979,294

(22) Filed: Nov. 2, 2022

(65) Prior Publication Data
US 2024/0095980 A1    Mar. 21, 2024

(30) Foreign Application Priority Data
Sep. 20, 2022   (CN) .......................... 202211144323.9

(51) Int. Cl.
*G06T 11/20*   (2006.01)
(52) U.S. Cl.
CPC .................................. *G06T 11/203* (2013.01)
(58) Field of Classification Search
CPC .............................. G06T 11/203; G06T 17/20
USPC ......................................................... 345/441
See application file for complete search history.

(56) References Cited

U.S. PATENT DOCUMENTS

2004/0227767 A1*  11/2004  Baroncelli .............. G06T 11/40
                                                                345/553

* cited by examiner

*Primary Examiner* — Javid A Amini
(74) *Attorney, Agent, or Firm* — HSML P. C.

(57) ABSTRACT

The present invention provides a method and a system for pixelating a vector graphic into an image. First, a vector graphic defined by an arbitrary curve boundary is approximated as a vector graphic of a Manhattan structure, and then a fast algorithm is used to pixelate the approximate Manhattan vector graphic into a two-dimensional image. A process of moving quadrant planes to superimpose on vertices of the vector graphic is replaced with convolution of an image resulting from a template rectangle image and Dirac pulse functions of the vertices of the vector graphic, and a pixelated image of this vector graphic is obtained through convolution of the template rectangle and a sparse image composed of Dirac pulses located at the positions of the vertices of the vector graphic.

10 Claims, 5 Drawing Sheets

METHOD AND SYSTEM FOR PIXELATING VECTOR GRAPHIC INTO IMAGE

TECHNICAL FIELD

The present invention pertains to the field of image processing, and more particularly, relates to a method and a system for pixelating a vector graphic into an image.

BACKGROUND ART

An image displayed on modern computer screens, or an image processed in scientific and engineering computation, is usually a collection of values on a two-dimensional grid, in which triangles in geometric structures, polygons with arbitrary curve boundaries, and other shapes cannot be directly displayed or processed. Therefore, it is necessary to convert these graphics into two-dimensional array images before the graphics can be displayed or processed on a computer screen. Pixelation is a process of converting a two-dimensional or three-dimensional graphic into a two-dimensional image, in which grid points (also known as pixels) inside a geometric shape will be assigned specific values, and a resulting two-dimensional image is represented by a two-dimensional array. The two-dimensional image can be displayed on a computer screen, or can participate in an operation process of image processing. Each point in the image contains color, depth, and texture data.

There are currently many methods to pixelate graphics into two-dimensional images, especially for graphics of a Manhattan structure, also for polygonal graphics containing edges with finite angles such as 45° and 135°. A simple method is to determine whether a pixel is inside a given graphic, and if the pixel is inside the graphic, the pixel is assigned a given value. However, this method requires pixel-by-pixel operations and requires considerable computational time. Another method is to decompose a polygon of a mask into "positive" and "negative" quarter planes, referred to as "quadrant planes" for short, and rasterize each quadrant plane into an image, then linearly superimpose the positive and negative quarter planes to obtain a polygonal pixelated image. However, when the size of the graphic becomes larger and the resolution of the image becomes higher, conversion of the quadrant planes into the images also requires accessing and modifying a large number of pixels, which will also consume considerable runtime. Dividing a large graphic into many small graphic sets, separately processing these small graphics, and then combining the small graphics according to cut boundaries can accelerate a computation process. However, this method requires a large number of polygon operations and markings, which increase the complexity and memory requirements of the method. A tree code-type strategy can also be employed to pixelate only a logarithmic number of graphics by pixelated resolution scaling, use this as a root node of a tree to propagate down and collect a logarithmic number of pixel values to each leaf node, thereby significantly improving runtime. However, again, this method is still very complex, especially in polygon boundary detection and processing.

Therefore, a simple and fast method for converting a vector graphic into an image is urgently needed to accelerate a pixelation process.

SUMMARY OF THE INVENTION

In view of the drawbacks of the prior art, the purpose of the present invention is to provide a method and a system for converting a vector graphic into an image, aiming to solve the problems in which the existing methods for converting vector graphics into images are complex and slow. The present disclosure provides a method and a system for pixelating a vector graphic into an image. First, a vector graphic defined by an arbitrary curve boundary is approximated as a vector graphic of a Manhattan structure, and then a fast algorithm is used to pixelate the approximate Manhattan vector graphic into a two-dimensional image. A process of moving quadrant planes to superimpose on vertices of the vector graphic is replaced with convolution of an image resulting from a template rectangle image and Dirac pulse functions of the vertices of the vector graphic, and a pixelated image of this vector graphic is obtained through convolution of the template rectangle and a sparse image composed of Dirac pulses located at the positions of the vertices of the vector graphic. The present disclosure may use only one convolution operation to pixelate the vector graphic into the image, greatly simplifying the existing process of implementing pixelation by moving quadrant planes for repeated superimposition. Furthermore, fast Fourier transform is employed to replace a space domain convolution process with frequency domain pointwise multiplication. The computation method of the present disclosure effectively improves computation efficiency, and reduces consumption of computation memory.

In order to achieve the above purpose, in a first aspect, the present invention provides a method for pixelating a vector graphic into an image, including the following steps:

determining a vector graphic, where the vector graphic is a graphic with an arbitrary curve boundary; performing Manhattanization on the vector graphic according to an area equivalence principle to obtain an approximate vector graphic of a Manhattan structure;

determining a minimum rectangle capable of containing the approximate vector graphic, and extending the minimum rectangle with the minimum rectangle as a center to obtain a working rectangle whose length and width are respectively twice the length and width of the minimum rectangle;

cross-cutting the working rectangle to equally divide the working rectangle into four regions, and padding a lower left corner region to obtain a padded rectangle after partially padding the working rectangle; meshing the padded rectangle according to a preset mesh step to obtain a working rectangle image, and performing fast Fourier transform on the working rectangle image to obtain a first spectral image;

meshing the working rectangle according to the preset step to obtain a blank two-dimensional mesh image; determining the position of each vertex of the approximate vector graphic, mapping the position of each vertex to a middle region of the blank two-dimensional mesh image, and padding a Dirac pulse function in each mapped position so as to pad a pixel value in each mapped position, and when a mapped position of a vertex is not in a mesh point of the blank two-dimensional mesh image, smoothing the mapped position thereof to an adjacent mesh point by using an inverse interpolation method to obtain a sparse image about the vertices of the approximate vector graphic, and performing fast Fourier transform on the sparse image to obtain a second spectral image; and performing convolution on the working rectangle image and the sparse image to obtain an extended image, where the convolution involves performing inverse fast Fourier transform after pointwise multiplying the first spectral image and the second spectral image; extracting a middle part of the extended image, to obtain a pixelated image of the vector graphic, the area of the middle part being ¼ of the area of the extended image.

In an optional example, the determining the minimum rectangle capable of containing the approximate vector graphic, and extending the minimum rectangle with the minimum rectangle as a center to obtain a working rectangle whose length and width are respectively twice the length and width of the minimum rectangle specifically comprises:

assuming that the length of the minimum rectangle is W and the width is H, extending a frame of the minimum rectangle by W/2 along two ends of the length, and then extending the same by H/2 along two ends of the width respectively, so as to generate the working rectangle with the length of 2 W and the width of 2 H.

In an optional example, the extracting the middle part of the extended image, to obtain a pixelated image of the vector graphic specifically comprises:

in the case where the length of the extended image is 2 W and the width is 2 H, assuming the coordinates of the four vertices of the extended image are (0, 0), (0, 2 H), (2 W, 0), and (2 W, 2 H), respectively; and extracting a [W/2,3 W/2)×[H/2,3 H/2) part of the extended image as the pixelated image of the vector graphic.

In an optional example, the performing Manhattanization on the vector graphic according to an area equivalence principle to obtain an approximate vector graphic of a Manhattan structure specifically comprises:

when the vector graphic does not have a curve boundary, stepping all non-horizontal or non-vertical straight edges thereof to obtain the approximate vector graphic of the Manhattan structure;

when the vector graphic has a curve boundary, according to the area equivalence principle, first using a straight line boundary to approximate the curve boundary, and then stepping the straight line boundary to obtain the approximate vector graphic of the Manhattan structure.

In an optional example, the determining the position of each vertex of the approximate vector graphic, mapping the position of each vertex to a middle region of the blank two-dimensional mesh image, and padding a Dirac pulse function in each mapped position so as to pad a pixel value in each mapped position specifically comprises:

reading the position of each vertex of the approximate vector graphic, and padding in the corresponding position of the blank two-dimensional mesh image with the Dirac pulse function $\{\pm\delta(x-x_i,y-y_i)\}_i$, and when the position of the vertex is not in the mesh point of the blank two-dimensional mesh image, smoothing the vertex to a pixel of the adjacent mesh point by using the inverse interpolation method to reach a sub-pixel resolution, so as to obtain the sparse image about the vertices of the approximate vector graphic, where a determination condition of the sign "±" of the Dirac impulse function is: first assigning a sign "+" to a lower left vertex of the vertices, then reading the vertices counterclockwise, and assigning a sign "−" to a next vertex, and so on, to alternately assign signs "+" and "−", until confirmation of a sign of a clockwise neighbor vertex of the lower left vertex is completed, where δ is a binary function, x and y represent two variables of the function, $x_i$ and $y_i$ represent the coordinates of each vertex of the approximate vector graphic, and i represents the numeral of the vertex.

In an optional example, when variables of the two-dimensional array corresponding to the padded rectangle are separable in two directions of abscissa and ordinate:

the step of meshing the padded rectangle according to a preset mesh step to obtain a working rectangle image, and performing fast Fourier transform on the working rectangle image to obtain a first spectral image is replaced with the following step:

representing the padded rectangle as multiplication of two one-dimensional arrays, the two one-dimensional arrays including a row vector array and a column vector array;

and the two steps of performing fast Fourier transform on the sparse image to obtain a second spectral image, and performing convolution on the working rectangle image and the sparse image to obtain an extended image are replaced by the following steps:

reading, row by row, elements of the sparse image, and acquiring a one-dimensional array of each sparse row; separately convolving the one-dimensional array of each sparse row with the row vector array to obtain a transitional one-dimensional array of each sparse row; padding the transitional one-dimensional array of each sparse row in a corresponding row of the sparse image; reading, column by column, elements of the sparse image padded with the transitional one-dimensional array, and acquiring a one-dimensional array of each sparse column; separately convolving the one-dimensional array of each sparse column with the column vector array to obtain a one-dimensional array of each corresponding column of the extended image; padding the one-dimensional array of the corresponding column into the extended image to obtain the final extended image, the convolution involving performing inverse fast Fourier transform after point-by-point multiplication in a frequency domain.

In a second aspect, the present invention provides a system for pixelating a vector graphic to an image, including:

a Manhattanization unit, configured to determine a vector graphic, where the vector graphic is a graphic with an arbitrary curve boundary; perform Manhattanization on the vector graphic according to an area equivalence principle to obtain an approximate vector graphic of a Manhattan structure;

a working rectangle determining unit, configured to determine a minimum rectangle capable of containing the approximate vector graphic, and extend the minimum rectangle with the minimum rectangle as a center to obtain a working rectangle whose length and width are respectively twice the length and width of the minimum rectangle;

a working rectangle padding unit, configured to cross-cut the working rectangle to equally divide the working rectangle into four regions, and pad a lower left corner region to obtain a padded rectangle after partially padding the working rectangle; mesh the padded rectangle according to a preset mesh step to obtain a working rectangle image, and perform fast Fourier transform on the working rectangle image to obtain a first spectral image;

a sparse image determining unit, configured to mesh the working rectangle according to the preset step to obtain a blank two-dimensional mesh image; determine the position of each vertex of the approximate vector graphic, map the position of each vertex to a middle region of the blank two-dimensional mesh image, and pad a Dirac pulse function in each mapped position so as to pad a pixel value in each mapped position, and when a mapped position of a vertex is not in a mesh point of the blank two-dimensional mesh image, smooth the mapped position thereof to an adjacent mesh point by using an inverse interpolation method to obtain a sparse image about the vertices of the approximate vector graphic, and perform fast Fourier transform on the sparse image to obtain a second spectral image; and an image extension and pixelation unit, configured to perform convolution on the working rectangle image and the sparse image to obtain an extended image, where the convolution involves performing inverse fast Fourier transform after pointwise multiplying the first spectral image and the second spectral image; extract a middle part of the extended image, to obtain a pixelated image of the vector graphic, the area of the middle part being ¼ of the area of the extended image.

In an optional example, the Manhattanization unit performing Manhattanization on the vector graphic according to an area equivalence principle to obtain an approximate vector graphic of a Manhattan structure specifically comprises: when the vector graphic does not have a curve boundary, stepping all non-horizontal or non-vertical straight edges thereof to obtain the approximate vector graphic of the Manhattan structure; and when the vector graphic has a curve boundary, according to the area equivalence principle, first using a straight line boundary to approximate the curve boundary, and then stepping the straight line boundary to obtain the approximate vector graphic of the Manhattan structure.

In an optional example, the working rectangle padding unit reads the position of each vertex of the approximate vector graphic, and pads in the corresponding position of the blank two-dimensional mesh image with the Dirac pulse function $\{\pm\delta(x-x_i,y-y_i)\}_i$, and when the position of the vertex is not in the mesh point of the blank two-dimensional mesh image, smooths the vertex to a pixel of the adjacent mesh point by using the inverse interpolation method to reach a sub-pixel resolution, so as to obtain the sparse image about the vertices of the approximate vector graphic, where a determination condition of the sign "±" of the Dirac impulse function is: first assigning a sign "+" to a lower left vertex of the vertices, then reading the vertices counterclockwise, and assigning a sign "−" to a next vertex, and so on, to alternately assign signs "+" and "−", until confirmation of a sign of a clockwise neighbor vertex of the lower left vertex is completed, where $\delta$ is a binary function, x and y represent two variables of the function, $x_i$ and $y_i$ represent the coordinates of each vertex of the approximate vector graphic, and i represents the numeral of the vertex.

In an optional example, when variables of the two-dimensional array corresponding to the padded rectangle are separable in two directions of abscissa and ordinate:

the working rectangle padding unit represents the padded rectangle as multiplication of two one-dimensional arrays, the two one-dimensional arrays including a row vector array and a column vector array, to replace the meshing the working rectangle according to a preset step to obtain a blank two-dimensional mesh image, and performing fast Fourier transform on the working rectangle image to obtain a first spectral image;

the sparse image determination unit reads, row by row, reading elements of the sparse image, and acquires a one-dimensional array of each sparse row; separately convolves the one-dimensional array of each sparse row with the row vector array to obtain a transitional one-dimensional array of each sparse row; pads the transitional one-dimensional array of each sparse row in a corresponding row of the sparse image; reads, column by column, elements of the sparse image padded with the transitional one-dimensional array, and acquires a one-dimensional array of each sparse column, to replace the performing fast Fourier transform on the sparse image to obtain a second spectral image;

the image extension and pixelation unit separately convolves the one-dimensional array of each sparse column with the column vector array to obtain a one-dimensional array of each corresponding column of the extended image; pads the one-dimensional array of the corresponding column into the extended image to obtain the final extended image, to replace the performing convolution on the working rectangle image and the sparse image to obtain an extended image, the convolution involving performing inverse fast Fourier transform after frequency domain pointwise multiplication.

In general, compared with the prior art, the above technical solutions proposed in the present invention have the following beneficial effects:

The present invention provides a method and a system for pixelating a vector graphic into an image. First, a vector graphic defined by an arbitrary curve boundary is approximated as a Manhattan vector graphic with a stepped structure, and then the approximate Manhattan vector graphic is pixelated into a two-dimensional image. The process is completed using a fast algorithm. A process of moving quadrant planes to superimpose on the vertices of the vector graphic is replaced with convolution of an image resulting from a template rectangle image and Dirac pulse functions $\delta(x-x_i, y-y_i)$ of the vertices of the vector graphic, and a pixelated image of this vector graphic is obtained through convolution of the template rectangle and a sparse image composed of Dirac pulses $\{\pm\delta(x-x_i,y-y_i)\}_i$, located at the positions of the vertices of the vector graphic.

The present invention provides a method and a system for pixelating a vector graphic into an image, which use only one convolution operation to pixelate the vector graphic into the image, greatly simplifying the existing process of implementing pixelation by moving quadrant planes for repeated superimposition. Furthermore, fast Fourier transform is employed to replace a convolution process in a space domain with point-by-point multiplication in a frequency domain. The computation method of the present invention effectively improves computation efficiency, reduces consumption of computation memory, and is suitable for situations where vector graphics with dense vertices, large sizes, and high pixel resolution requirements are converted into images.

The present invention provides a method and a system for pixelating a vector graphic into an image. By utilizing x-y separability of a two-dimensional image and the positive and negative properties of each Dirac pulse located at a polygon vertex, a vertex sparse image can be convolved in an x-direction $\{x \in [0,W]\}$ or a y-direction $\{y \in [0,H]\}$ row by row and column by column, reducing memory usage to only one row array and one column array, greatly reducing memory consumption as compared with the original two-dimensional image.

DETAILED DESCRIPTION

To make the purpose, technical solution, and advantages of the present invention clearer, the present invention is further described in detail below in connection with the accompanying drawings and embodiments. It should be understood that the specific embodiments described herein are only used to explain the present invention, but not to limit the present invention.

According to the present invention, first a vector graphic defined by an arbitrary curve boundary is approximated as a vector graphic of a Manhattan structure, and then the approximate Manhattan vector graphic thereof is pixelated into a two-dimensional image. The process is completed using a fast algorithm. A process of moving quadrant planes to superimpose on the vertices of the vector graphic is replaced with convolution of an image resulting from a template rectangle image and Dirac pulse functions $\delta(x-x_i, y-y_i)$ of the vertices of the vector graphic, and a pixelated image of this vector graphic is obtained through convolution of the template rectangle and a sparse image composed of Dirac pulses $\{\pm\delta(x-x_i, y-y_i)\}_i$, located at the positions of the vertices of the vector graphic. Only one convolution operation is used to pixelate the vector graphic into the image, greatly simplifying the existing process of implementing pixelization by moving quadrant planes for repeated superimposition. Furthermore, fast Fourier transform is employed to replace a convolution process in a space domain with point-by-point multiplication in a frequency domain. The computation method of the present invention effectively improves computation efficiency, reduces consumption of computation memory, and is suitable for situations where vector graphics with dense vertices, large sizes, and high pixel resolution requirements are converted into images.

By utilizing x-y separability of a two-dimensional image and the positive and negative properties of each Dirac pulse located at a polygon vertex, a vertex sparse image can be convolved in an x-direction $\{x \in [0,W)\}$ or a y-direction $\{y \in [0,H)\}$ row by row and column by column, reducing memory usage to only one row array and one column array, greatly reducing memory consumption as compared with the original two-dimensional image.

Figure 1:
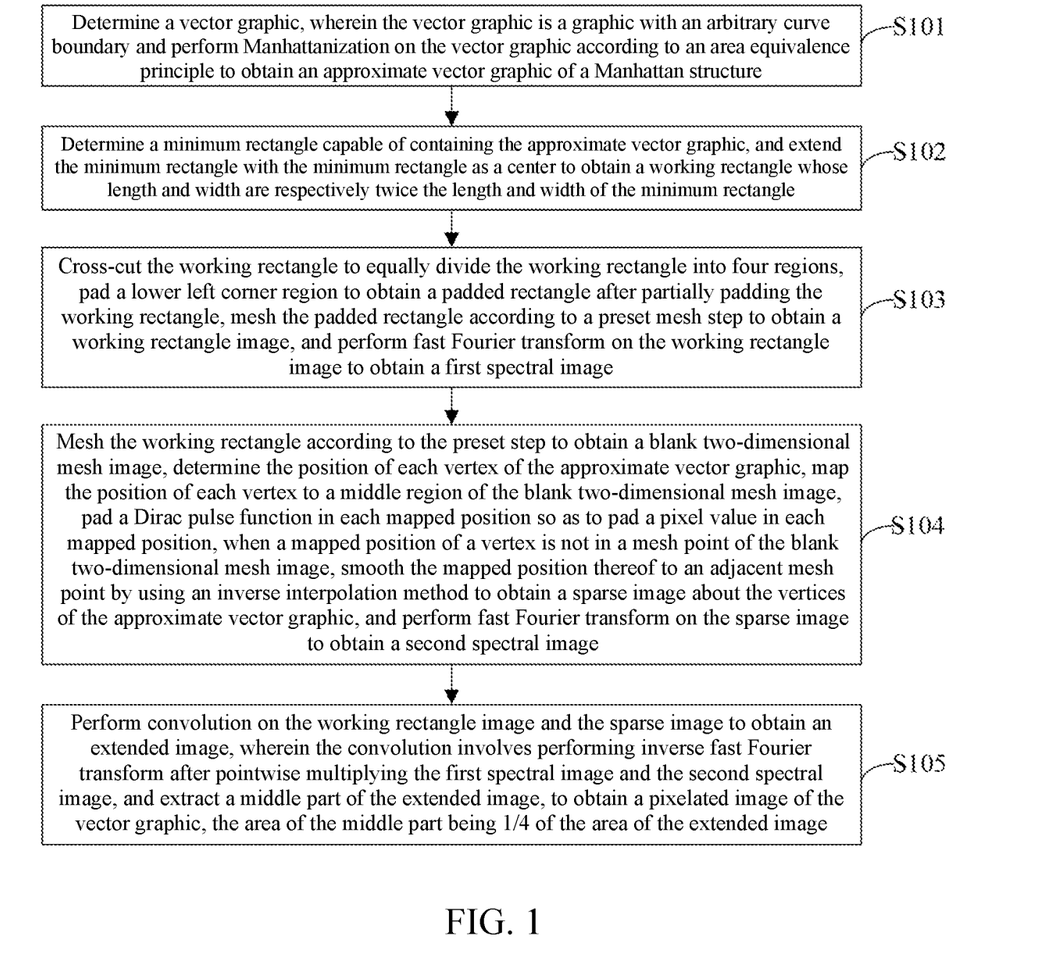
FIG. 1 is a flowchart of a method for pixelating a vector graphic into an image provided by an embodiment of the present invention.

FIG. 1 is a flowchart of a method for pixelating a vector graphic into an image provided by an embodiment of the present invention. As shown in FIG. 1, the method includes the following steps:

S101. Determine a vector graphic, where the vector graphic is a graphic with an arbitrary curve boundary; perform Manhattanization on the vector graphic according to an area equivalence principle to obtain an approximate vector graphic of a Manhattan structure.

S102. Determine a minimum rectangle capable of containing the approximate vector graphic, and extend the minimum rectangle with the minimum rectangle as a center to obtain a working rectangle whose length and width are respectively twice the length and width of the minimum rectangle.

S103. Cross-cut the working rectangle to equally divide the working rectangle into four regions, and pad a lower left corner region to obtain a padded rectangle after partially padding the working rectangle; mesh the padded rectangle according to a preset mesh step to obtain a working rectangle image, and perform fast Fourier transform on the working rectangle image to obtain a first spectral image.

S104. Mesh the working rectangle according to the preset step to obtain a blank two-dimensional mesh image; determine the position of each vertex of the approximate vector graphic, map the position of each vertex to a middle region of the blank two-dimensional mesh image, and pad a Dirac pulse function in each mapped position so as to pad a pixel value in each mapped position, and when a mapped position of a vertex is not in a mesh point of the blank two-dimensional mesh image, smooth the mapped position thereof to an adjacent mesh point by using an inverse interpolation method to obtain a sparse image about the vertices of the approximate vector graphic, and perform fast Fourier transform on the sparse image to obtain a second spectral image;

S105. Perform convolution on the working rectangle image and the sparse image to obtain an extended image, where the convolution involves performing inverse fast Fourier transform after pointwise multiplying the first spectral image and the second spectral image, and extract a middle part of the extended image, to obtain a pixelated image of the vector graphic, the area of the middle part being ¼ of the area of the extended image.

The solution of the present invention will be described below in detail by using Embodiment 1.

Figure 2:
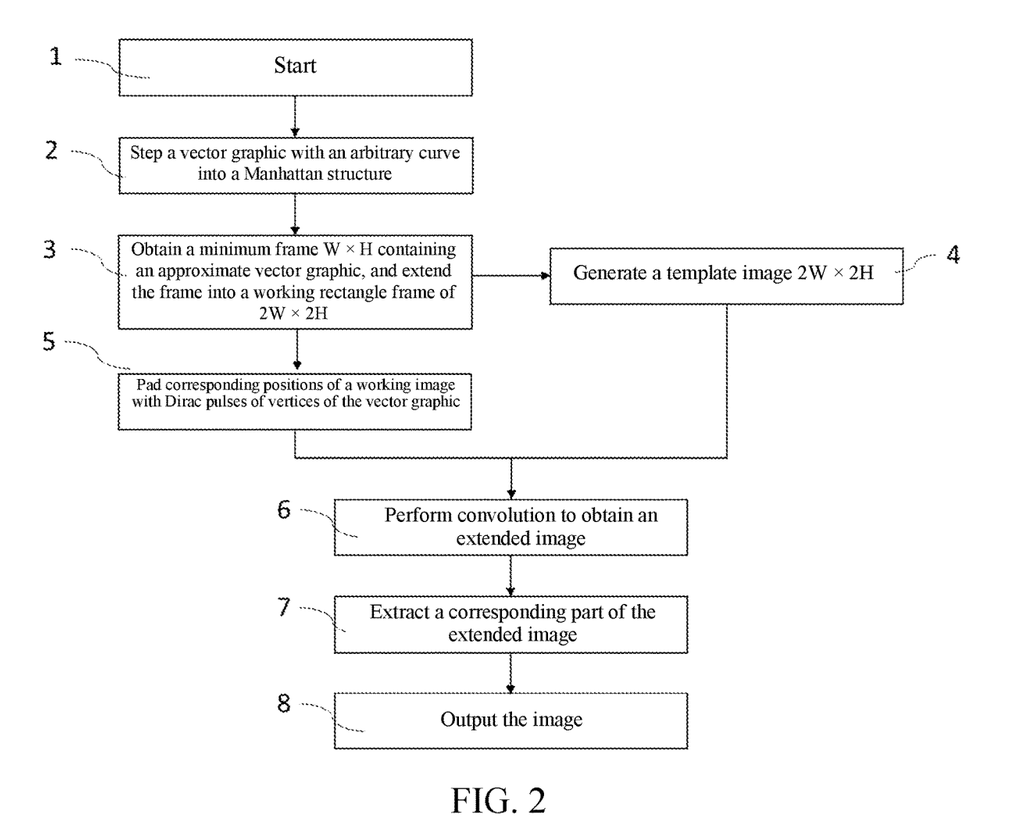
FIG. 2 is a flowchart of pixelating a vector graphic provided by an embodiment of the present invention.

The present invention is suitable for pixelating vector graphics with dense vertices, larger sizes, and higher pixel resolution requirements into two-dimensional images, and specific steps thereof are as shown in FIG. 2.

Step 1. Perform Manhattanization on a vector graphic with an arbitrary curve boundary. By employing an area equivalence principle, first a vector graphic with a straight-line boundary is used to approximate the vector graphic with the curve boundary, and then the vector graphic with the straight-line boundary is approximated as a vector graphic of a Manhattan structure through stepping.

Figure 3:
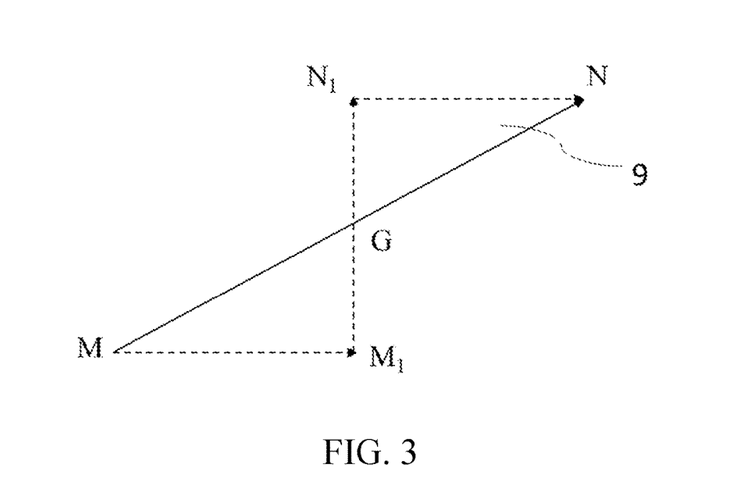
FIG. 3 is a schematic diagram of edge stepping of a non-Manhattan structure provided by an embodiment of the present invention.

Stepping is applicable to the edges of non-Manhattan structures. In non-Manhattan graphics, stepwise approximation is to be performed for each edge with a non-horizontal or non-vertical angle. As shown in FIG. 3, for an edge MN of the vector graphic, a midpoint G thereof is taken, to extend from the point G to a point M1 and a point N1 in upward and downward directions, respectively. The points M1 and N1 are at the same height as that of the two end points M and N of the edge. The points M and M1, M1 and N1, and N1 and N are connected. These three edges represent stepped edges of the edge MN. By dividing the edge MN into multiple segments and then stepping each segment, stepwise approximation accuracy can be improved.

Step 2. Obtain a minimum rectangle frame W×H that is capable of containing the approximate Manhattan vector graphic, then extend the rectangle frame by dimensions of W/2 and H/2 in length and width directions, respectively, to generate a working rectangle frame 2 W×2 H, and perform padding within [0,W]×[0,H] dimensions of the working rectangle frame (i.e., a finite-sized quadrant with a length of W and a width of H). According to a set mesh step S, the working rectangle frame is meshed to obtain a template image B, and a spectral image $f(B)$ after Fourier transform of the image B is pre-calculated.

Step 3. Mesh the working rectangle frame of 2 W×2 H according to the given step S to obtain a blank two-dimensional mesh image.

Figure 4:
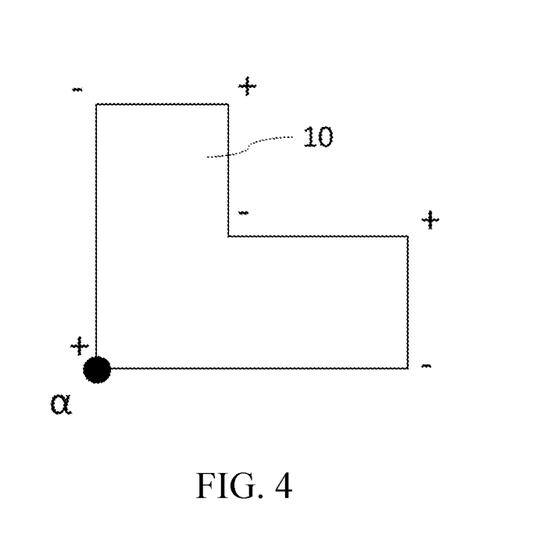
FIG. 4 is a schematic diagram of a Dirac pulse symbol provided by an embodiment of the present invention.

The approximate vector graphic of the Manhattan structure in step 1 is obtained, the positions of vertices are read, and corresponding positions of the two-dimensional mesh image are padded with Dirac pulse functions $\{\pm\delta(x-x_i,y-y_i)\}_i$. When the position of a vertex of the vector graphic is not in a mesh point of the two-dimensional image, the vertex is smoothed to a pixel of an adjacent mesh point by using an inverse interpolation method to obtain a sparse image A about the vertices of the approximate vector graphic. A condition for determining the "±" sign of the Dirac pulse is as follows: obtaining a polygon, as shown in FIG. 4, assigning a sign "+" to a vertex α at the lower left of the polygon, reading vertices counterclockwise, and assigning a sign "−" to the next vertex, and so on to alternately assign signs "+" and "−" until sign confirmation of the lower right vertex is completed.

Figure 5:
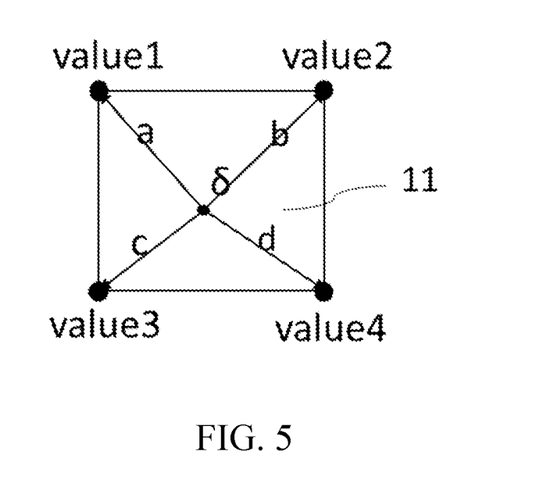
FIG. 5 is a schematic diagram of a bilinear inverse interpolation provided by an embodiment of the present invention.

The inverse interpolation method is suitable for situations where the vertices of the vector graphic do not completely fall on the pixelated meshes, including but not limited to nearest neighbor method inverse interpolation, bilinear inverse interpolation, cubic inverse interpolation, etc. In this embodiment, bilinear inverse interpolation is used. As shown in FIG. 5, the distances from a vertex δ to adjacent four meshes are a, b, c, and d, and values on the meshes are value1, value2, value3, and value4. The calculation method is as follows:

sum=bcd+acd+abc+bcd
 value1=bcd/sum
 value2=acd/sum
 value3=abd/sum
 value4=abc/sum Step 4. Convolve the sparse image A and the template image B to obtain an extended image C. A convolution process in a space domain is replaced with point-by-point multiplication in a frequency domain. Fast Fourier transform is performed on the sparse image A to obtain a frequency domain function $f(A)$, and $f(A)$ and $f(B)$ are pointwise multiplied and then subjected to inverse Fourier transform, to obtain the extended image C.

Step 5. Extract a [W/2,3 W/2)×[H/2,3 H/2) part of the extended image C, which is a desired pixelated image C' of the vector graphic.

Figure 6:
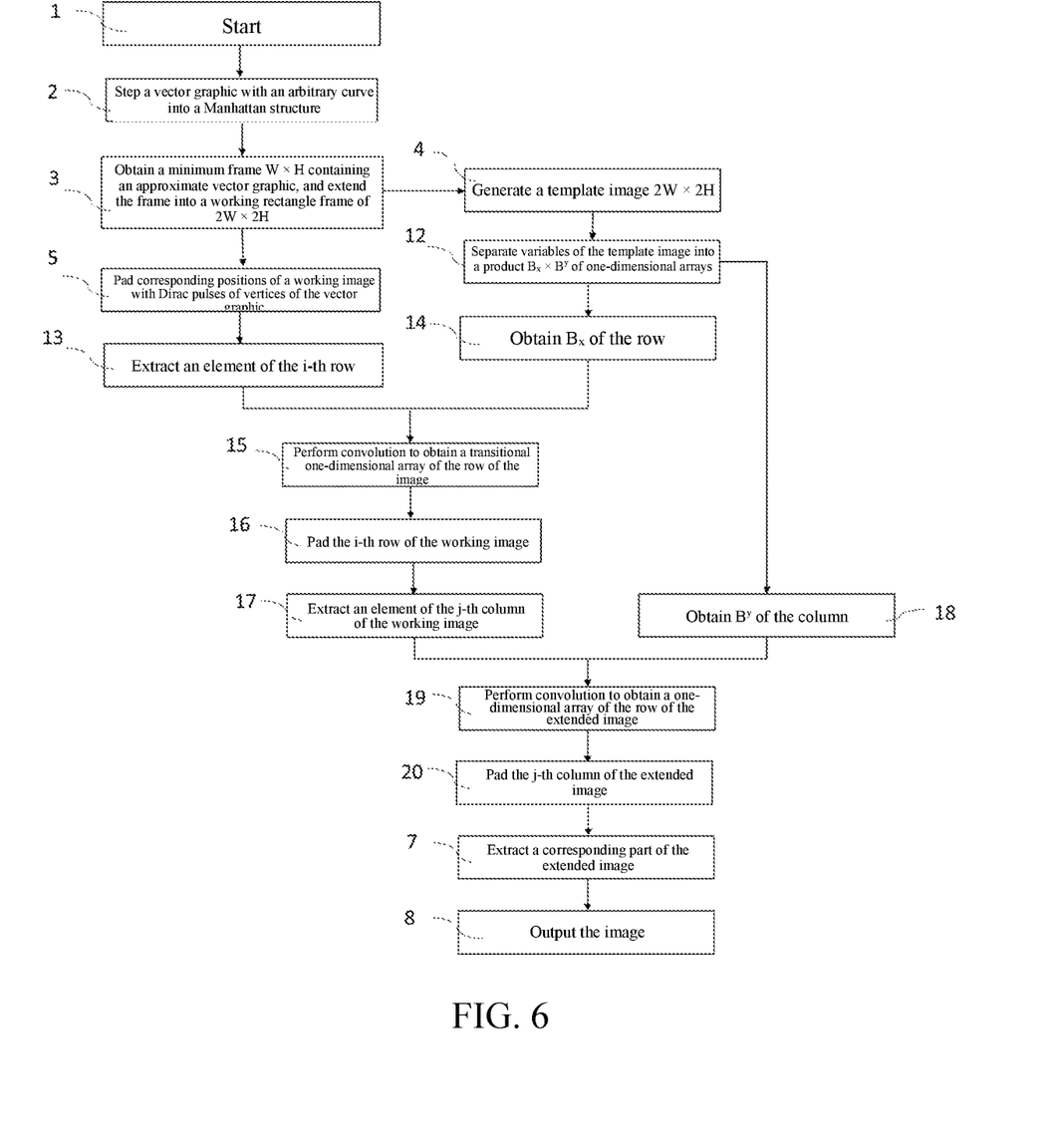
FIG. 6 is a flowchart of Embodiment 2 provided by an embodiment of the present invention.

The solution of the present invention is described in detail below by using Embodiment 2:

When variables of the template image B are separable in horizontal and vertical directions, B can be expressed as the product of one-dimensional arrays in the horizontal and vertical directions $B(i,j)=B_x(i)$ $x=B^y(j)$, where i and j represent the mesh coordinates of the image B in the x and y directions. Therefore, the sparse image A can be convolved in the x-direction $\{x \in [0, 2 W)\}$ and y-direction $\{y \in [0, 2 H)\}$ on a row-by-row and column-by-column basis, reducing memory usage overheads to only one row or column of memory space, specifically by steps shown in FIG. 6:

Step 1. Perform Manhattanization on a vector graphic with an arbitrary curve boundary. By employing an area equivalence principle, first a vector graphic with a straight-line boundary is used to approximate the vector graphic with the curve boundary, and then the vector graphic with the straight-line boundary is approximated as a vector graphic of a Manhattan structure through stepping.

Stepping is applicable to the edges of non-Manhattan structures. In non-Manhattan graphics, stepwise approximation is to be performed for each edge with a non-horizontal or non-vertical angle. As shown in FIG. 3, for an edge MN of the vector graphic, a midpoint G thereof is taken, to extend from the point G to a point M1 and a point N1 in upward and downward directions, respectively. The points M1 and N1 are at the same height as that of the two end points M and N of the edge. The points M and M1, M1 and N1, and N1 and N are connected. These three edges represent stepped edges of the edge MN. By dividing the edge MN into multiple segments and then stepping each segment, stepwise approximation accuracy can be improved.

Step 2. Obtain a minimum rectangle frame W×H that is capable of containing the approximate Manhattan vector graphic, then extend the rectangle frame by dimensions of W/2 and H/2 in length and width directions, respectively, to generate a working rectangle frame 2 W×2 H, and perform padding within [0,W]×[0,H] dimensions of the working rectangle frame (i.e., a finite-sized quadrant with a length of W and a width of H). When variables of the working rectangle are separable in horizontal and vertical coordinate directions, the template image B generated after the meshing of the 2 W×2 H working rectangle frame is replaced with the product $B_x \times B^y$ of one-dimensional arrays in the horizontal and vertical directions, to calculate in advance spectral line segments $f(B_x)$ and $f(B^y)$ after Fourier transform of $B_x$ and $B^y$.

Step 3. Mesh the working rectangle frame of 2 W×2 H according to the given step S to obtain a blank two-dimensional mesh image. The approximate vector graphic of the Manhattan structure in step 1 is obtained, the positions of vertices are read, and corresponding positions of the two-dimensional mesh image are padded with Dirac pulse functions $\{\pm\delta(x-x_i,y-y_i)\}_i$, in the range of [W/2,3 W/2)×[H/2,3 H/2). When the position of a vertex of the vector graphic is not in a mesh point of the two-dimensional image, the vertex is smoothed to an adjacent pixel point by using an inverse interpolation method to reach a sub-pixel resolution to obtain a sparse image A about the vertices of the vector graphic. A condition for determining the "±" sign of the Dirac pulse is as follows: obtaining a polygon, as shown in FIG. 4, assigning a sign "+" to a vertex α at the lower left of the polygon, reading vertices counterclockwise, and assigning a sign "−" to the next vertex, and so on to alternately assign signs "+" and "−" until sign confirmation of the lower right vertex is completed.

The inverse interpolation method is suitable for situations where the vertices of the vector graphic do not completely fall on the pixelated meshes, including but not limited to nearest neighbor method inverse interpolation, bilinear inverse interpolation, cubic inverse interpolation, etc. In this embodiment, bilinear inverse interpolation is used. As shown in FIG. 5, the distances from a vertex δ to adjacent four meshes are a, b, c, and d, and values on the meshes are value1, value2, value3, and value4. The calculation method is as follows:

sum=bcd+acd+abc+bcd
 value1=bcd/sum
 value2=acd/sum
 value3=abd/sum
 value4=abc/sum Step 4. Read, row by row, elements of the sparse image A to obtain a one-dimensional array $A_i$ of a sparse row, where i=H/2,H/2+1, . . . , 3 H/2, and perform a convolution operation on the one-dimensional array $A_i$ and a one-dimensional array $B_x$ of a template line to obtain a transitional one-dimensional array $D_i$. A space domain convolution process is replaced with frequency domain pointwise multiplication. Fast Fourier transform is performed on the one-dimensional array $A_i$ to obtain a frequency domain function $f(A_i)$, and $f(A_i)$ and $f(B_x)$ are pointwise multiplied and then subjected to inverse Fourier transform, to give the transitional one-dimensional array $D_i$.

Step 5. Pad the one-dimensional array $D_i$ into the ith row of the sparse image A (2 W×2 H).

Step 6. Read the elements of the sparse image A column by column, obtain a one-dimensional array $A^j$ of a sparse column, where j=W/2,W/2+1, . . . , 3 W/2, and perform a convolution operation on the one-dimensional array $A^j$ and a one-dimensional array $B^y$ of a template column to obtain a one-dimensional array $C^j$ of an extended image column. A convolution process in a space domain is replaced with point-by-point multiplication in a frequency domain. Fast Fourier transform is performed on the sparse one-dimensional array $A^j$ to obtain a frequency domain function $f(A^j)$, and $f(A^j)$ and $f(B^y)$ are pointwise multiplied and then subjected to inverse Fourier transform, to give the one-dimensional array $C^j$ of the extended image column.

Step 7: Pad the one-dimensional array $C^j$ of the extended image column into the jth column of the extended image C (2 W×2 H).

Step 8: Extract a [W/2,3 W/2)×[H/2,3 H/2) part of the extended image C, which is a desired pixelated image C' of the vector graphic.

Figure 7:
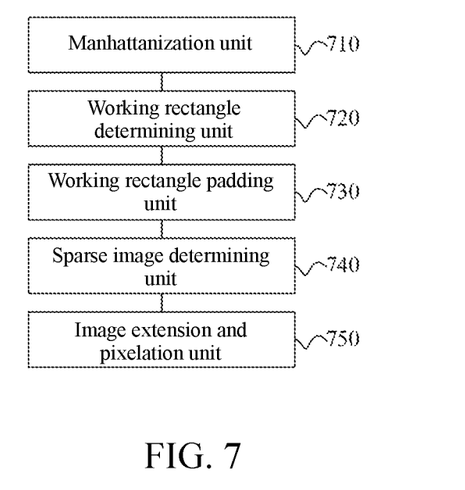
FIG. 7 is an architectural diagram of a system for pixelating a vector graphic into an image provided by an embodiment of the present invention.

FIG. 7 is a system architecture diagram for pixelating a vector graphic into an image provided by an embodiment of the present invention, as shown in FIG. 7, including:

a Manhattanization unit 710, configured to determine a vector graphic, where the vector graphic is a graphic with an arbitrary curve boundary, and perform Manhattanization on the vector graphic according to an area equivalence principle to obtain an approximate vector graphic of a Manhattan structure;

a working rectangle determining unit 720, configured to determine a minimum rectangle capable of containing the approximate vector graphic, and extend the minimum rectangle with the minimum rectangle as a center to obtain a working rectangle whose length and width are respectively twice the length and width of the minimum rectangle;

a working rectangle padding unit 730, configured to cross-cut the working rectangle to equally divide the working rectangle into four regions, pad a lower left corner region to obtain a padded rectangle after partially padding the working rectangle, mesh the padded rectangle according to a preset mesh step to obtain a working rectangle image, and perform fast Fourier transform on the working rectangle image to obtain a first spectral image;

a sparse image determining unit 740, configured to mesh the working rectangle according to the preset step to obtain a blank two-dimensional mesh image, determine the position of each vertex of the approximate vector graphic, map the position of each vertex to a middle region of the blank two-dimensional mesh image, and pad a Dirac pulse function in each mapped position so as to pad a pixel value in each mapped position, smooth a mapped position of a vertex to an adjacent mesh point by using an inverse interpolation method to obtain a sparse image about the vertices of the approximate vector graphic when the mapped position of the vertex is not in a mesh point of the blank two-dimensional mesh image, and perform fast Fourier transform on the sparse image to obtain a second spectral image; and an image extension and pixelation unit 750, configured to perform convolution on the working rectangle image and the sparse image to obtain an extended image, where the convolution involves performing inverse fast Fourier transform after pointwise multiplying the first spectral image and the second spectral image, and extract a middle part of the extended image, to obtain a pixelated image of the vector graphic, the area of the middle part being ¼ of the area of the extended image.

It can be understood that reference may be made to the description in the above embodiments of the method for detailed functions of the units in FIG. 7, which will not be described herein again.

In addition, the present invention further provides a computer-readable storage medium, which stores a computer program that, when executed by a processor, implements the methods in the above embodiments.

Based on the methods in the foregoing embodiments, embodiments of the present invention provide a computer program product, which, when run on a processor, causes the processor to perform the methods in the above embodiments.

On the basis of the methods in the above embodiments, embodiments of the present invention further provide a chip including one or a plurality of processors and an interface circuit. Optionally, the chip may further include a bus. Among them, the processor may be an integrated circuit chip with signal processing capabilities. During implementation, the steps of the foregoing methods can be completed by an integrated logic circuit in hardware in the processor or an instruction in the form of software. The aforementioned processor may be a general-purpose processor, a digital communicator (DSP), an application specific integrated circuit (ASIC), a field programmable gate array (FPGA), or other programmable logic devices, discrete gate or transistor logic devices, discrete hardware components. Various methods and steps disclosed in the embodiments of the present application can be implemented or executed. The general-purpose processor may be a microprocessor, or the processor may be any conventional processor or the like.

The interface circuit can be used to send or receive data, instructions, or information. The processor can use the data, instructions, or other information received by the interface circuit for processing, and can send the processed information through the interface circuit.

Optionally, the chip further includes a memory, which may include a read-only memory and a random access memory, and provides operation instructions and data to the processor. A portion of the memory may also include non-volatile random access memory (NVRAM).

Optionally, the memory stores executable software modules or data structures, and the processor can execute corresponding operations by calling operation instructions stored in the memory (the operation instructions may be stored in an operating system).

Optionally, the interface circuit can be used to output execution results of the processor.

It should be noted that the respective functions of the processor and the interface circuit can be implemented by hardware design, software design, or a combination of software and hardware, which is not limited herein.

It should be understood that the steps in the above method embodiments can be implemented by logic circuits in the form of hardware or instructions in the form of software in the processor.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A method for pixelating a vector graphic into an image, characterized by comprising the following steps:

determining a vector graphic, wherein the vector graphic is a graphic with an arbitrary curve boundary; performing Manhattanization on the vector graphic according to an area equivalence principle to obtain an approximate vector graphic of a Manhattan structure;

determining a minimum rectangle capable of containing the approximate vector graphic, and extending the minimum rectangle with the minimum rectangle as a center to obtain a working rectangle whose length and width are respectively twice the length and width of the minimum rectangle;

cross-cutting the working rectangle to equally divide the working rectangle into four regions, and padding a lower left corner region to obtain a padded rectangle after partially padding the working rectangle; meshing the padded rectangle according to a preset mesh step to obtain a working rectangle image, and performing fast Fourier transform on the working rectangle image to obtain a first spectral image;

meshing the working rectangle according to the preset step to obtain a blank two-dimensional mesh image; determining the position of each vertex of the approximate vector graphic, mapping the position of each vertex to a middle region of the blank two-dimensional mesh image, and padding a Dirac pulse function in each mapped position so as to pad a pixel value in each mapped position, and when a mapped position of a vertex is not in a mesh point of the blank two-dimensional mesh image, smoothing the mapped position thereof to an adjacent mesh point by using an inverse interpolation method to obtain a sparse image about the vertices of the approximate vector graphic, and performing fast Fourier transform on the sparse image to obtain a second spectral image; and performing convolution the working rectangle image and the sparse image to obtain an extended image, wherein the convolution involves performing inverse fast Fourier transform after pointwise multiplying the first spectral image and the second spectral image; extracting a middle part of the extended image, to obtain a pixelated image of the vector graphic, the area of the middle part being ¼ of the area of the extended image.

2. The method according to claim 1, wherein the determining the minimum rectangle capable of containing the approximate vector graphic, and extending the minimum rectangle with the minimum rectangle as a center to obtain a working rectangle whose length and width are respectively twice the length and width of the minimum rectangle specifically comprises:

assuming that the length of the minimum rectangle is W and the width is H, extending a frame of the minimum rectangle by W/2 along two ends of the length, and then extending the same by H/2 along two ends of the width respectively, so as to generate the working rectangle with the length of 2 W and the width of 2 H.

3. The method according to claim 2, wherein the extracting the middle part of the extended image, to obtain a pixelated image of the vector graphic specifically comprises:

in the case where the length of the extended image is 2 W and the width is 2 H, assuming coordinates of four vertices of the extended image are (0, 0), (0, 2 H), (2 W, 0), and (2 W, 2 H), respectively; and extracting a [W/2,3 W/2)×[H/2,3 H/2) part of the extended image as the pixelated image of the vector graphic.

4. The method according to claim 1, wherein the performing Manhattanization on the vector graphic according to an area equivalence principle to obtain an approximate vector graphic of a Manhattan structure specifically comprises:

when the vector graphic does not have a curve boundary, stepping all non-horizontal or non-vertical straight edges thereof to obtain the approximate vector graphic of the Manhattan structure; and when the vector graphic has a curve boundary, according to the area equivalence principle, first using a straight line boundary to approximate the curve boundary, and then stepping the straight line boundary to obtain the approximate vector graphic of the Manhattan structure.

5. The method according to claim 1, wherein the determining the position of each vertex of the approximate vector graphic, mapping the position of each vertex to a middle region of the blank two-dimensional mesh image, and padding a Dirac pulse function in each mapped position so as to pad a pixel value in each mapped position specifically comprises:

reading the position of each vertex of the approximate vector graphic, and padding the Dirac pulse function $\{\pm\delta(x-x_i, y-y_i)\}_i$ in the corresponding position of the blank two-dimensional mesh image, and when the position of the vertex is not in the mesh point of the blank two-dimensional mesh image, smoothing the vertex to a pixel of the adjacent mesh point by using the inverse interpolation method to reach a sub-pixel resolution, so as to obtain the sparse image about the vertices of the approximate vector graphic, wherein a determination condition of the sign "±" of the Dirac impulse function is: first assigning a sign "+" to a lower left vertex of the vertices, then reading the vertices counterclockwise, and assigning a sign "−" to a next vertex, and so on, to alternately assign signs "+" and "−", until confirmation of a sign of a clockwise neighbor vertex of the lower left vertex is completed, wherein δ is a binary function, x and y represent two variables of the function, $x_i$ and $y_i$ represent the coordinates of each vertex of the approximate vector graphic, and i represents the numeral of the vertex.

6. The method according to claim 1, wherein when variables of the two-dimensional array corresponding to the padded rectangle are separable in two directions of abscissa and ordinate:

the step of meshing the padded rectangle according to a preset mesh step to obtain a working rectangle image, and performing fast Fourier transform on the working rectangle image to obtain a first spectral image is replaced with the following step:

representing the padded rectangle as multiplication of two one-dimensional arrays, the two one-dimensional arrays comprising a row vector array and a column vector array;

and the two steps of performing fast Fourier transform on the sparse image to obtain a second spectral image, and performing convolution on the working rectangle image and the sparse image to obtain an extended image are replaced by the following steps:

reading, row by row, elements of the sparse image, and acquiring a one-dimensional array of each sparse row; separately convolving the one-dimensional array of each sparse row with the row vector array to obtain a transitional one-dimensional array of each sparse row; padding the transitional one-dimensional array of each sparse row in a corresponding row of the sparse image; reading, column by column, elements of the sparse image padded with the transitional one-dimensional array, and acquiring a one-dimensional array of each sparse column; separately convolving the one-dimensional array of each sparse column with the column vector array to obtain a one-dimensional array of each corresponding column of the extended image; and padding the one-dimensional array of the corresponding column into the extended image to obtain the final extended image, the convolution involving performing inverse fast Fourier transform after frequency domain pointwise multiplication.

7. A system for pixelating a vector graphic into an image, characterized by comprising:
a Manhattanization unit, configured to determine a vector graphic, wherein the vector graphic is a graphic with an arbitrary curve boundary, and perform Manhattanization on the vector graphic according to an area equivalence principle to obtain an approximate vector graphic of a Manhattan structure;
a working rectangle determining unit, configured to determine a minimum rectangle capable of containing the approximate vector graphic, and extend the minimum rectangle with the minimum rectangle as a center to obtain a working rectangle whose length and width are respectively twice the length and width of the minimum rectangle;
a working rectangle padding unit, configured to cross-cut the working rectangle to equally divide the working rectangle into four regions, pad a lower left corner region to obtain a padded rectangle after partially padding the working rectangle, mesh the padded rectangle according to a preset mesh step to obtain a working rectangle image, and perform fast Fourier transform on the working rectangle image to obtain a first spectral image;
a sparse image determining unit, configured to mesh the working rectangle according to the preset step to obtain a blank two-dimensional mesh image, determine the position of each vertex of the approximate vector graphic, map the position of each vertex to a middle region of the blank two-dimensional mesh image, pad a Dirac pulse function in each mapped position so as to pad a pixel value in each mapped position, smooth a mapped position of a vertex to an adjacent mesh point by using an inverse interpolation method to obtain a sparse image about the vertices of the approximate vector graphic when the mapped position of the vertex is not in a mesh point of the blank two-dimensional mesh image, and perform fast Fourier transform on the sparse image to obtain a second spectral image; and
an image extension and pixelation unit, configured to perform convolution on the working rectangle image and the sparse image to obtain an extended image, wherein the convolution involves performing inverse fast Fourier transform after pointwise multiplying the first spectral image and the second spectral image, and extract a middle part of the extended image, to obtain a Pixelated Image of the Vector Graphic, the Area of the Middle Part being ¼ of the Area of the extended image.

8. The system according to claim 7, wherein the Manhattanization unit performing Manhattanization on the vector graphic according to an area equivalence principle to obtain an approximate vector graphic of a Manhattan structure specifically comprises: when the vector graphic does not have a curve boundary, stepping all non-horizontal or non-vertical straight edges thereof to obtain the approximate vector graphic of the Manhattan structure; and when the vector graphic has a curve boundary, according to the area equivalence principle, first using a straight line boundary to approximate the curve boundary, and then stepping the straight line boundary to obtain the approximate vector graphic of the Manhattan structure.

9. The system according to claim 8, wherein the working rectangle padding unit reads the position of each vertex of the approximate vector graphic, pads the Dirac pulse function $\{\pm\delta(x-x_i, y-y_i)\}_i$, in the corresponding position of the blank two-dimensional mesh image, and when the position of the vertex is not in the mesh point of the blank two-dimensional mesh image, smooths the same to a pixel of the adjacent mesh point by using the inverse interpolation method to reach a sub-pixel resolution, so as to obtain the sparse image about the vertices of the approximate vector graphic, wherein a determination condition of the sign "±" of the Dirac impulse function is: first assigning a sign "+" to a lower left vertex of the vertices, then reading the vertices counterclockwise, and assigning a sign "−" to a next vertex, and so on, to alternately assign signs "+" and "−", until confirmation of a sign of a clockwise neighbor vertex of the lower left vertex is completed, wherein $\delta$ is a binary function, x and y represent two variables of the function, $x_i$ and $y_i$ represent the coordinates of each vertex of the approximate vector graphic, and i represents the numeral of the vertex.

10. The system according to claim 8, wherein when variables of a two-dimensional array corresponding to the padded rectangle are separable in two directions of abscissa and ordinate:
the working rectangle padding unit represents the padded rectangle as multiplication of two one-dimensional arrays, the two one-dimensional arrays comprising a row vector array and a column vector array, to replace the meshing the padded rectangle according to a preset mesh step to obtain a working rectangle image, and performing fast Fourier transform on the working rectangle image to obtain a first spectral image;
the sparse image determination unit reads, row by row, elements of the sparse image, acquires a one-dimensional array of each sparse row, separately convolves the one-dimensional array of each sparse row with the row vector array to obtain a transitional one-dimensional array of each sparse row, pads the transitional one-dimensional array of each sparse row in a corresponding row of the sparse image, reads, column by column, elements of the sparse image padded with the transitional one-dimensional array, and acquires a one-dimensional array of each sparse column, to replace the performing fast Fourier transform on the sparse image to obtain a second spectral image; and
the image extension and pixelation unit separately convolves the one-dimensional array of each sparse column with the column vector array to obtain a one-dimensional array of each corresponding column of the extended image, and pads the one-dimensional array of the corresponding column in the extended image to obtain the final extended image, to replace the performing convolution on the working rectangle image and the sparse image to obtain an extended image, the convolution involving performing inverse fast Fourier transform after frequency domain pointwise multiplication.

\* \* \* \* \*